US007936782B2

(12) United States Patent
Qin et al.

(10) Patent No.: US 7,936,782 B2
(45) Date of Patent: May 3, 2011

(54) METHOD AND SYSTEM FOR BIDIRECTIONAL BANDWIDTH RESERVATION IN WIRELESS COMMUNICATION SYSTEMS

(75) Inventors: Xiangping Qin, San Jose, CA (US); Harkirat Singh, Santa Clara, CA (US); Huai-Rong Shao, San Jose, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 943 days.

(21) Appl. No.: 11/890,168

(22) Filed: Aug. 2, 2007

(65) Prior Publication Data
US 2008/0198875 A1    Aug. 21, 2008

Related U.S. Application Data

(60) Provisional application No. 60/901,933, filed on Feb. 15, 2007.

(51) Int. Cl.
*H04J 3/16* (2006.01)
(52) U.S. Cl. .................. 370/468; 370/329; 370/442
(58) Field of Classification Search .................. 370/329, 370/442, 468
See application file for complete search history.

(56) References Cited

U.S. PATENT DOCUMENTS

| 7,359,398 | B2 * | 4/2008 | Sugaya .................. 370/431 |
| 7,489,656 | B2 * | 2/2009 | Guo et al. ............... 370/329 |
| 2007/0002743 | A1 * | 1/2007 | Fan ......................... 370/235 |
| 2007/0064669 | A1 * | 3/2007 | Classon et al. ......... 370/347 |
| 2007/0104215 | A1 * | 5/2007 | Wang et al. ............. 370/458 |
| 2008/0101253 | A1 * | 5/2008 | Shvodian ................ 370/252 |

OTHER PUBLICATIONS

Hitachi, LTD., et al. "Mapping DTCP to IP—DTCP 1 Supplement E Revision 1.1 (Informational Version)," Feb. 28, 2005, pp. 1-32 US.
SiBEAM, "Recommended Solution for Mapping DRCP-RTT Requirement in WirelessHD," Jan. 2007, pp. 1-16 US.
Clark, D., "Window and Acknowledgement Strategy in TCP,"Jul. 1982, pp. 1-20, US.
Wireless HD, LLC, WirelessHD Specification Revision 0.6d2, Jan. 16, 2007, 453 pp., US.

* cited by examiner

*Primary Examiner* — Phuc Tran
(74) *Attorney, Agent, or Firm* — Kenneth L. Sherman, Esq.; Michael Zarrabian, Esq.; Myers Andras Sherman & Zarrabian LLP

(57) ABSTRACT

A method and system for bandwidth allocation for communicating information over one or more wireless channels by wireless stations, is provided. The channel time is divided into one or more superframes. Available channel bandwidth is allocated by reserving one or more channel time blocks (CTBs) in a superframe for communication, resulting in one or more residue CTBs among the reserved CTBs in the superframe, and allocating at least a portion of one or more residue CTBs in the superframe for bidirectional communication between two stations.

26 Claims, 16 Drawing Sheets

40

70

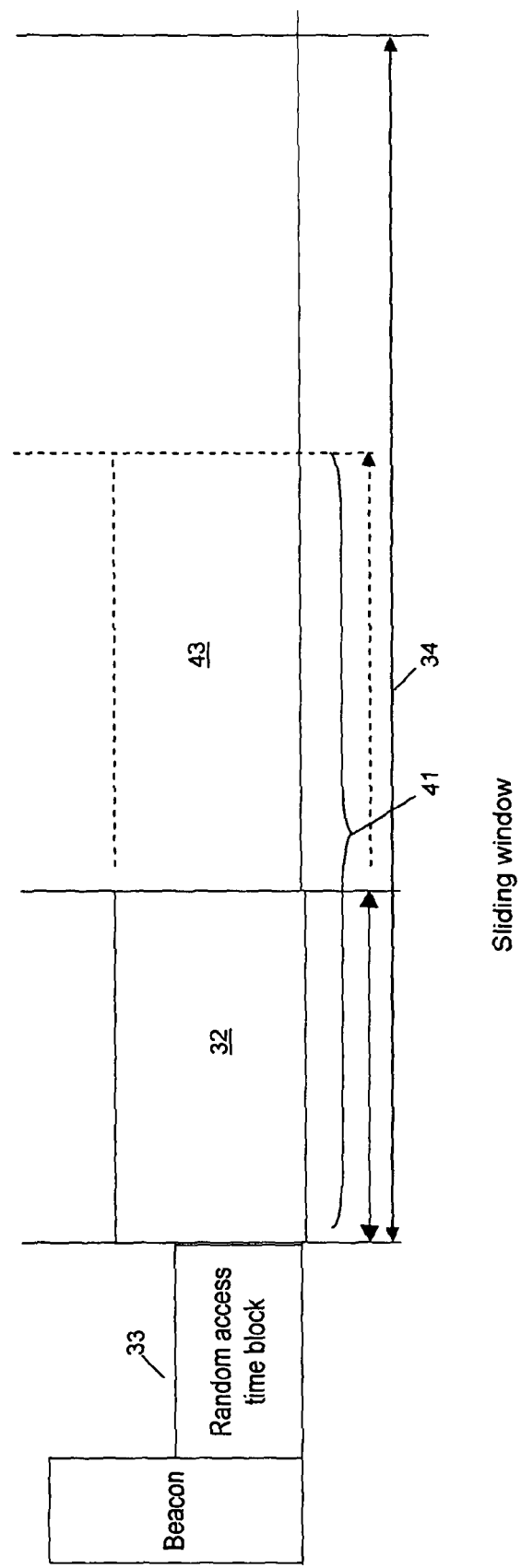

METHOD AND SYSTEM FOR BIDIRECTIONAL BANDWIDTH RESERVATION IN WIRELESS COMMUNICATION SYSTEMS

RELATED APPLICATION

This application claims priority from U.S. Provisional Patent Application Ser. No. 60/901,933, filed on Feb. 15, 2007, incorporated herein by reference.

FIELD OF THE INVENTION

The present invention relates generally to wireless networks, and in particular to bandwidth allocation in wireless networks.

BACKGROUND OF THE INVENTION

With the proliferation of content such as audio/visual information, protecting such content from unauthorized copying and distribution has become important for content providers. At the same time, many consumers wish to move content between their devices such as MP3 players, personal computers, DVDs, digital televisions (DTVs), etc. Many content providers utilize content protection standards. One example is the Digital Transmission Content Protection (DTCP) standard, which implements a cryptographic protocol for protecting content from unauthorized access as it is transmitted via digital interfaces or mediums including physical interfaces and wired/wireless interfaces (e.g., USB, internet protocol (IP), Ethernet, IEEE 802.11, IEEE 1394).

In localizing content then, many content providers require proximity control when copyright protected content is transmitted from one device to another. Because said interfaces are typically bidirectional, the copy protection approach involves localizing the transmission or distribution of protected content by implementing a proximity control, wherein an exchange of protected content is limited within a local area network (LAN) such as a home network. A proximity control involves proximity detection for network control messages. One of the requirements of proximity control/detection is to limit the Round Trip Time (RTT) from one device to another. This helps prevent unauthorized sharing of protected content between remote devices, and downloads from external sources such as the Internet. RTT control messages are typically messages exchanged to detect proximity between two network devices. Such control messages may include a message indicating the initiation of an RTT proximity test and a response RTT message indicating the end of that RTT proximity test.

For wireless transmission of copyrighted content, content providers also wish to enforce a proximity control requirement, wherein the content can only be accessed (transmitted) within a limited range of the content location in a device. To insure this, RTT testing is conducted wherein the RTT is the time between: (1) the transmission of a message from a transmitter device (e.g., a source) to a receiver device (e.g., a sink), and (2) the receipt of a response by the transmitter device from the receiver device. For example, in said DTCP protocol, RTT duration must be less than 7 milliseconds (msec). Only when the test is passed legitimately (i.e., in less than 7 msec) can keys be exchanged between the transmitter and the receiver for content transmission therebetween. The RTT test also must be authenticated to prevent access by malicious users.

However, in wireless communication systems, the actual RTT duration varies significantly depending on variations in transmission time and processing time. Further, channel bandwidth resources are limited for wireless transmissions shared among devices. There is, therefore, a need for a method and system for bandwidth allocation to support proximity control in wireless networks.

BRIEF SUMMARY OF THE INVENTION

The present invention provides a method and system for bandwidth reservation for communicating information over one or more channels in a wireless communication system. In one embodiment, the channel bandwidth (time) is divided into one or more superframes. Available channel bandwidth is allocated by reserving one or more channel time blocks (CTBs) in a superframe, resulting in one or more residue CTBs among the reserved CTBs in the superframe. Then, at least a portion of one or more residue CTBs in the superframe are allocated for bidirectional communication between two wireless stations.

In one implementation, the bidirectional communication comprises communicating proximity control messages between the two wireless stations during the allocated residue CTBs. For example, the bidirectional communication comprises communicating Round Trip Time (RTT) proximity control protocol messages between the two wireless stations during the allocated residue CTBs. Allocating one or more residue CTBs can further include allocating a number of residue CTBs sufficient for conducting RTT message exchanges between the two wireless stations to satisfy a certain round trip time limit for proximity control and at the same time incurs no changes to the existing reservations. One example of the existing reservation is isochronous reservation for video streams.

Allocating one or more residue CTBs can further include selecting an initial bandwidth allocation window, allocating one or more residue CTBs within the window, attempting a RTT proximity control protocol message exchange between the two stations, and if the RTT test fails, then enlarging the allocation window by an increment and repeating the RTT proximity control protocol message exchange between the two stations.

These and other features, aspects and advantages of the present invention will become understood with reference to the following description, appended claims and accompanying figures.

BRIEF DESCRIPTION OF THE DRAWINGS

FIGS. 12A-B show a sliding window bandwidth reservation implementation, according to an embodiment of the present invention.

DETAILED DESCRIPTION OF THE INVENTION

The present invention provides a method and system for bandwidth allocation for communicating information over one or more wireless channels in a communication system. The present invention enables bidirectional transmissions by allocating bandwidth for control message reservations to coexist with on-going, existing traffic.

In one embodiment, the allocation process provides a bidirectional block residue bandwidth reservation scheme (i.e., bandwidth allocation/de-allocation). Such a scheme enables bandwidth allocation that facilitates reservations for control message exchange, such as in RTT testing for fulfilling proximity control requirements. The bandwidth reservation scheme can also be used for other wireless networks and other allocation purposes as well. RTT testing in wireless communication systems such as 60 GHz wireless networks is an example application of the reservation scheme for reserving bandwidth, such that RTT tests are not interfered with by other traffic. The reservation scheme allows the RTT testing to occur in the same superframe as other/existing ongoing traffic (such as video and audio traffic), with minimal effect.

An example implementation is now described below in conjunction with a wireless network for communication of video information such as high-definition (HD) video as in WirelessHD (WiHD). WiHD is an industry-led effort to define a wireless digital network interface specification for wireless HD digital signal transmission on the 60 GHz frequency band, e.g., for consumer electronics (CE) and other electronic products. An example WiHD network utilizes a 60 GHz-band mmWave technology to support a physical (PHY) layer data transmission rate of multi-Gbps (gigabits per second), and can be used for transmitting uncompressed high-definition television (HDTV) signals wirelessly. The WiHD system includes wireless devices with multiple antennas, wherein directional beams are formed for transmitting/receiving HD data. Such a system can support a 1080p HD format which requires a raw data rate of about 2.98 Gbps (frame_size×number_of_frames_per_sec=1920×1080×3×8×60).

Figure 1:
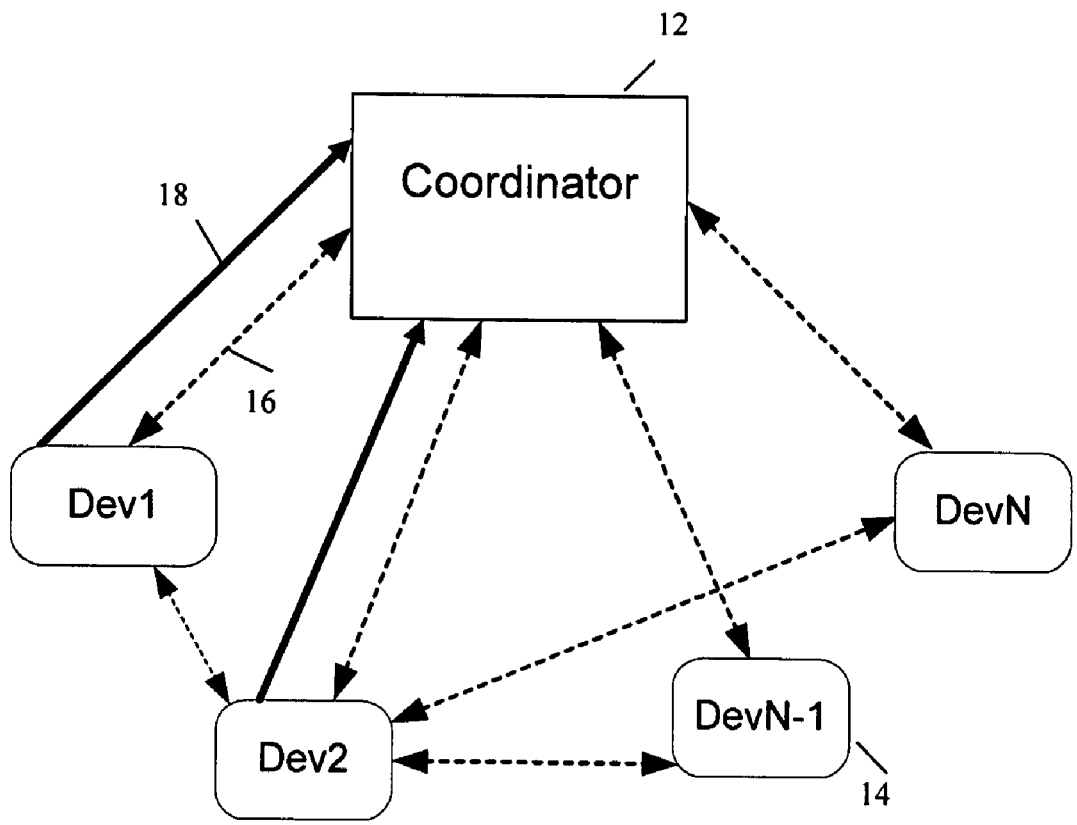
FIG. 1 shows a functional block diagram of a wireless communication system that implements a channel bandwidth reservation scheme, according to an embodiment of the present invention.

FIG. 1 shows a functional block diagram of an example wireless network 10, such as a 60 GHz wireless network, that includes a wireless communication coordinator 12, and multiple wireless communication stations 14 (e.g., devices Dev-1, ..., Dev-N), according to an embodiment of the present invention. The coordinator can be implemented as a standalone device, or in a (CE) device such as a TV, a DVR, a set-top box (STB), etc.

In 60 GHz wireless networks, there are high-rate and low-rate transmission modes. The coordinator 12 and the devices 14 utilize a low-rate (LR) channel 16 (shown by the dashed lines in FIG. 1) and a high-rate (HR) channel 18 (shown by the heavy solid lines in FIG. 1) for communication therebetween. Control messages including RTT test messages are transmitted on the low-rate mode/channel. However, since overhead (e.g., transmission time) for the low-rate transmissions is large, the present invention provides channel bandwidth reservation schemes that efficiently allocate bandwidth for conducting RTT testing in proximity control operations.

Figure 2:
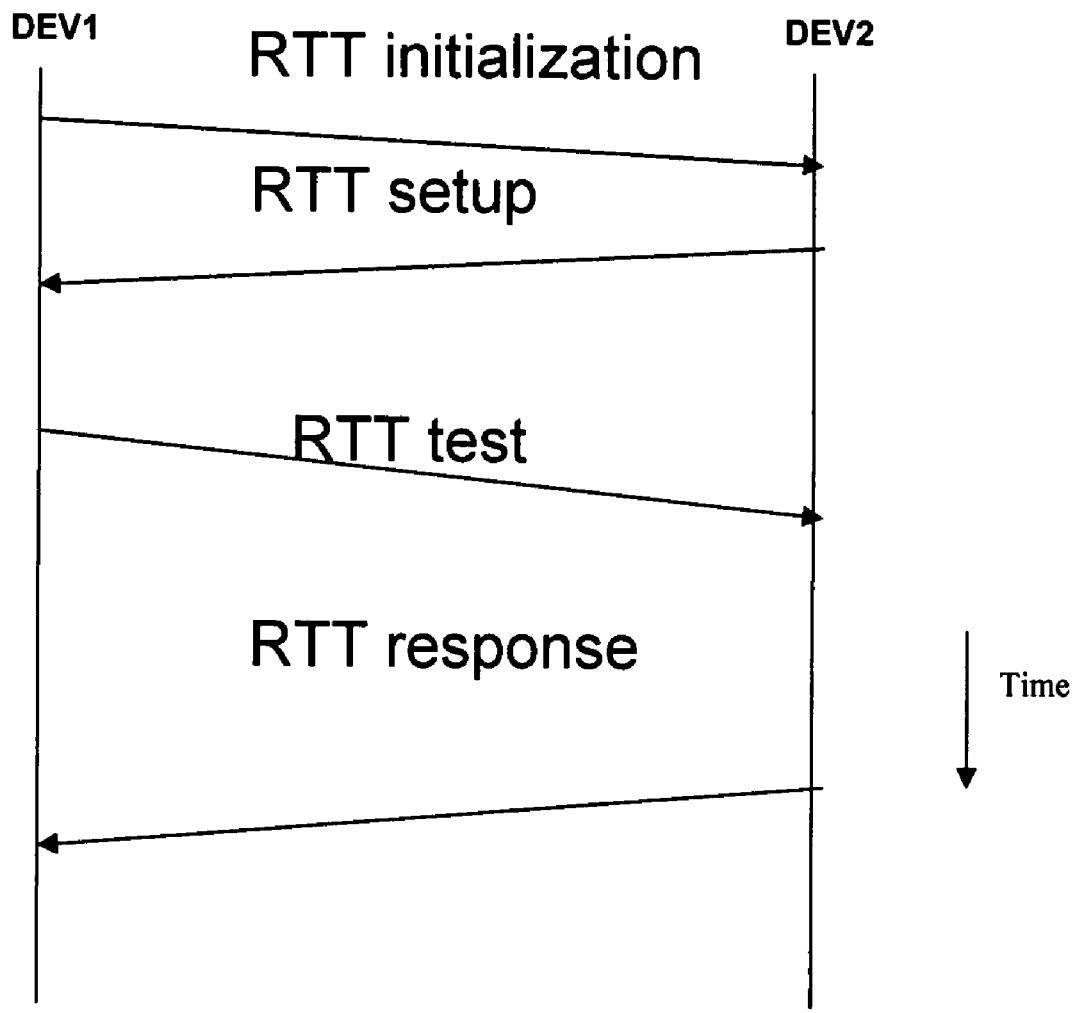
FIG. 2 shows an example event diagram of a conventional RTT test message exchange protocol between two devices.

FIG. 2 shows an example event diagram of a conventional RTT test message exchange protocol 20 between two devices (such as DEV1, DEV2 in the network 10). The RTT initialization and RTT setup messages are used to exchange authentication information. These messages can be transmitted over the low-rate channel in a random access period or by reservation (the random access period is not used for an RTT test, but the messages used for initial setup can be transmitted through the random access period). If the messages are transmitted in the random access period, and a first transmission fails because of interference, second or third trials can be made.

However, because RTT testing is used to measure the round trip time, retransmissions cause errors in the measurement and legitimate devices will be falsely refused. As such, according to an embodiment of the present invention a bandwidth reservation is made for RTT message exchanges before the RTT test begins. After a bandwidth reservation is made (such that other devices refrain from transmission on the low-rate channel during the reserved period), the RTT test messages can be transmitted without any interference from other devices, thereby preventing the need for message retransmissions.

In 60 GHz wireless networks, such as WiHD, a frame/block structure is used for data transmission between a transmitter and a receiver, wherein time is divided into blocks and allocated to different streams or message transmissions. The high-rate and low-rate channels operate in a Time Division Duplex (TDD) scheduling mode, wherein only one channel can be activated at any given instant for transmission.

Figure 3A:
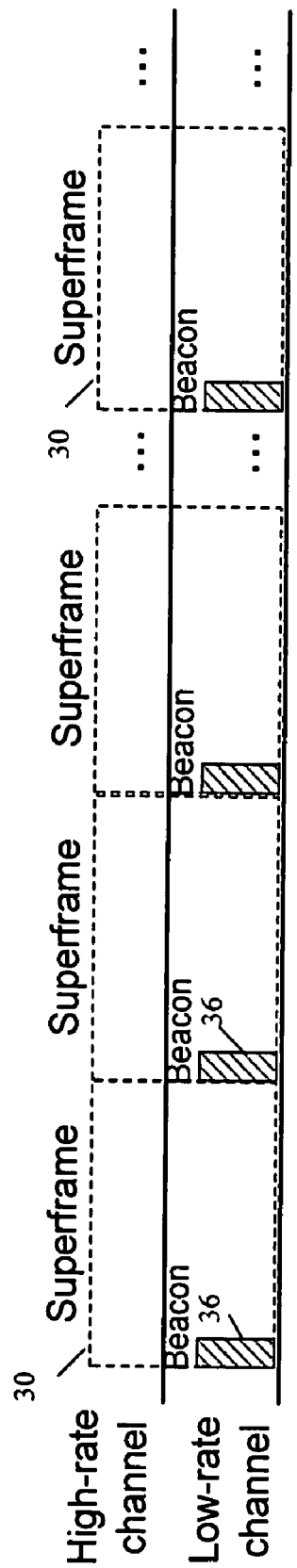
FIG. 3A shows an example superframe structure for bandwidth allocation.

A reservation scheme according to the present invention is applied to the low-rate channel based on a superframe structure, shown by example in FIG. 3A, including superframes 30 separated by beacons 36, described further below. Audio and video (AV) streams usually require isochronous CTB allocations. In a contention-free period (CFP), time scheduling is utilized, wherein beacons provide information about scheduled channel time blocks. Further, a bandwidth reservation scheme is applied based on the superframe structure wherein beacons divide the channel time into multiple superframes. In each superframe there are contention periods and CFPs. In each CFP there are one or more schedules, wherein each schedule includes one or more periodic reserved CTBs for transmission of isochronous data streams. The schedules represent reserved CTBs, and the time periods between the schedules are unreserved CTBs.

Figure 3B:
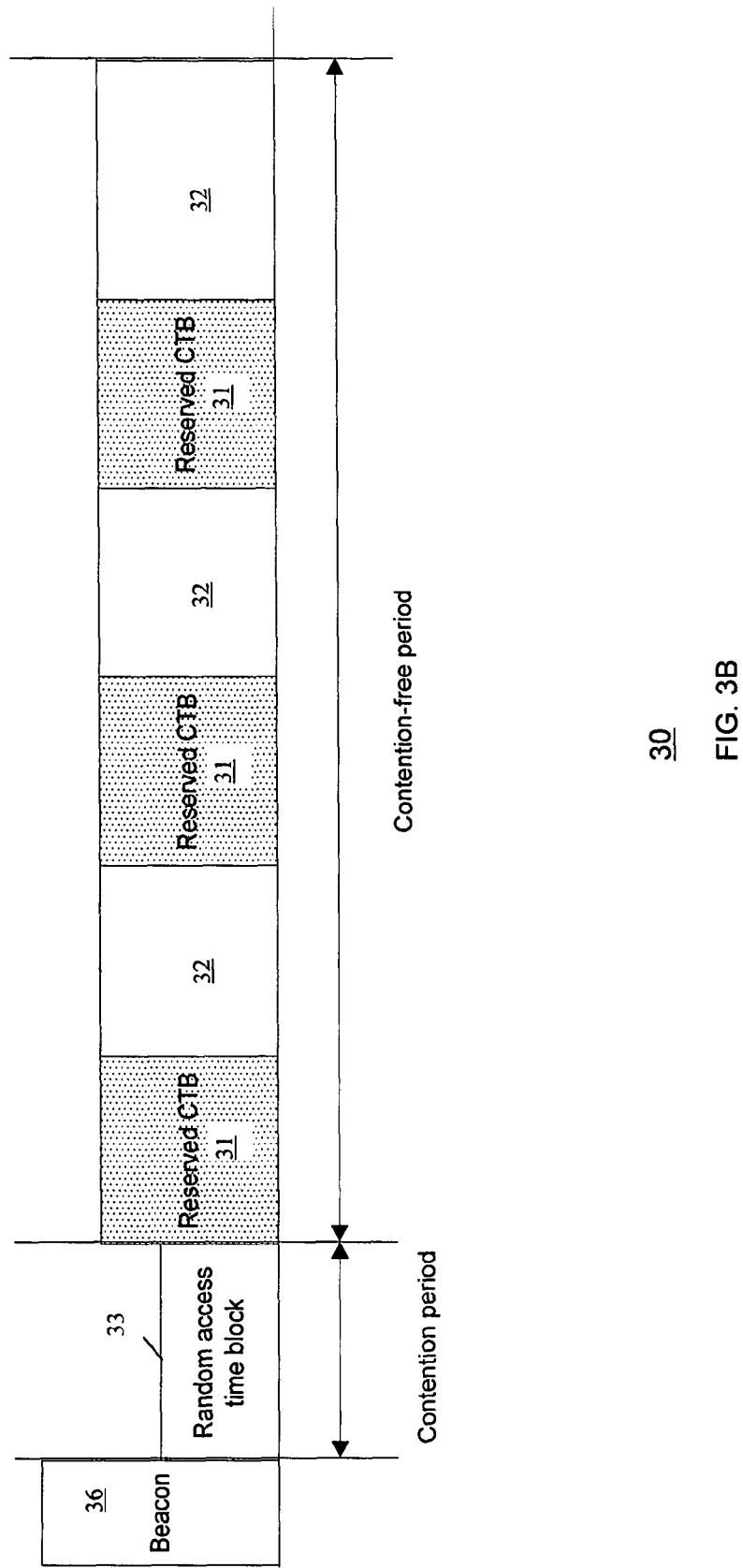
FIG. 3B shows an example superframe including residue channel time blocks (residue CTBs) for communication/control on a low-rate channel, according to the present invention.

As shown by example in FIG. 3B, each superframe 30 includes two CTB categories: reserved CTBs 31 and unreserved CTBs 32. Further each superframe 30 may include a random access period 33. The time blocks (CTBs) allocated to the AV streams are usually allocated periodically and with the same size. This type of AV allocation can span many superframes to accommodate an AV application. As a result, there remain the unreserved CTBs in a superframe to be used for other purposes than the ongoing traffic. Such remaining CTBs are termed residue CTBs 32 herein.

For one superframe, the coordinator first allocates the CTBs for AV traffic, thereafter the rest of the CTBs are all allocated to be residue CTBs (for communication/control on the low-rate channel). The residue CTBs 32 are those CTBs which are not pre-allocated to existing transmissions. These residue CTBs 32 can be apart and the length of each CTB varies. Depending on the existing traffic, the length of each residue CTB 32 can be small.

Figure 3C:
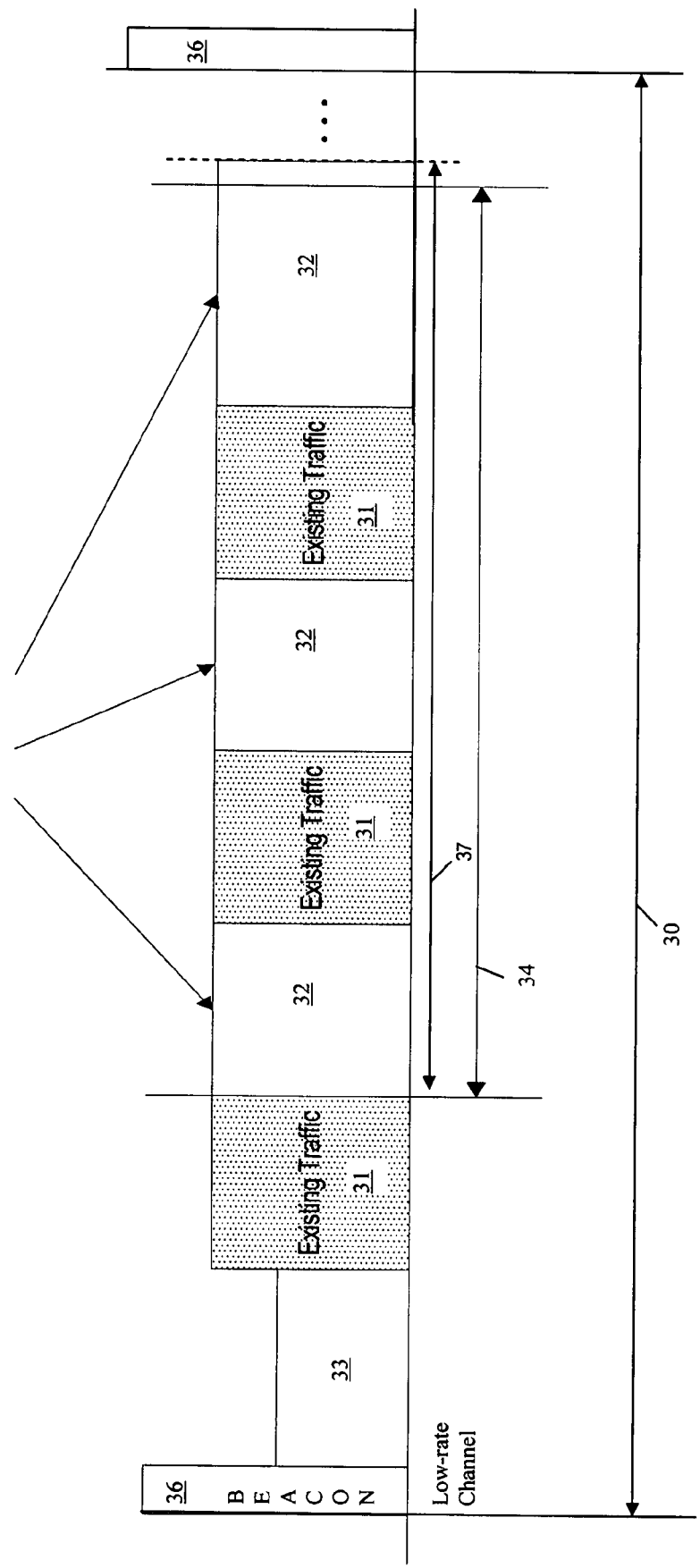
FIG. 3C shows an example block residue reservation scheme according to the present invention.

There can be randomness in message exchanges due to unpredictable factors such as the message processing delays in the devices, the round trip delay and the queuing delays. Therefore, in some circumstances a single residue CTB may not properly accommodate such randomness in message exchanges. As such, according to the present invention, multiple residue CTBs can be allocated for message exchanges. An example block residue reservation scheme 35 is shown in FIG. 3C according to the present invention, wherein a block of time 34 that includes multiple residue CTBs 32 is reserved for message exchanges such as RTT message exchanges over the low-rate channel.

The coordinator 12 in the network 10 provides channel coordination functions for wireless communication between devices, using a beacon frame 36 which provides such devices with reservation schedules. According to the block residue reservation scheme, the coordinator receives a request for channel time reservation, and in response provides a schedule 37 to a pair of devices by reserving at least a portion of one or more of the residue CTBs 32 in the time block 34 for message exchange between them. For example, if a bandwidth request for RTT testing is received by the coordinator, it then performs bandwidth allocation according to the bidirectional reservation scheme described herein for RTT message exchanges during the time block 34. Then two devices can communicate copyright protected AV content therebetween after the RTT test succeeds.

The length of the time block 34 is defined in the schedule 37 for the pair of devices. In one example, a beacon can include bandwidth allocation information elements, indicating that a certain length of a CTB is used for bidirectional residual reservations, according to the present invention. Because existing schedules for reserved CTBs 31 are known from schedules in the beacons, the pair of devices which receive their schedule 37 can easily compute the reserved residue CTBs 32 that are left in the time block 34 in between the reserved CTBs 31. The pair of devices can then use the reserved residue CTBs 32 to transmit packets without interference from the existing traffic in the reserved CTBs 31.

Figure 4:
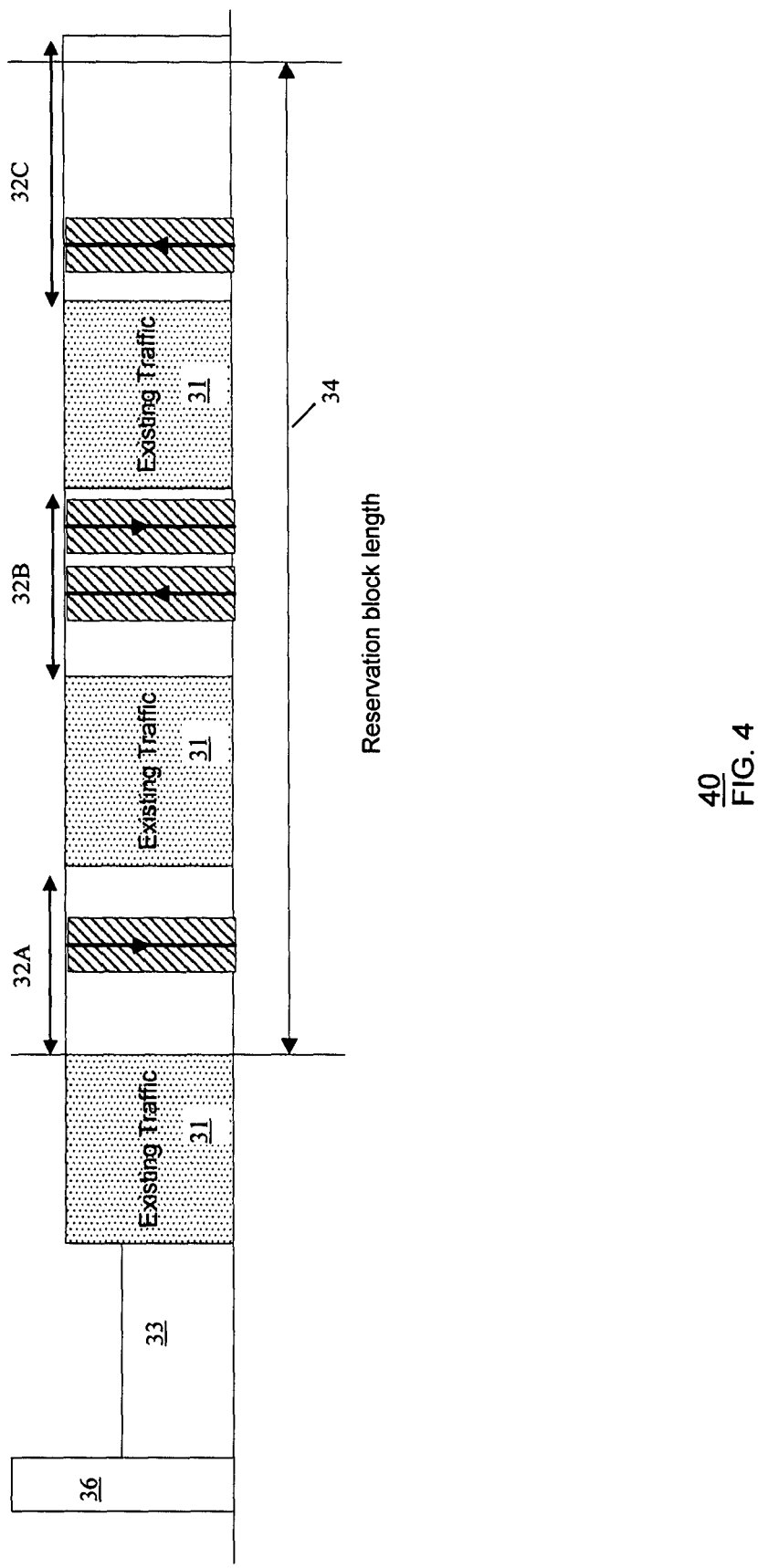
FIG. 4 shows an example reservation including a bidirectional reservation time block comprising residue CTBs, according to the present invention.

The reservation scheme implements a bidirectional reservation, wherein time is reserved for message exchange between a pair of devices, rather than a uni-directional reservation wherein during a reservation one or more messages are sent from one device to another (and not vice versa). As such, according to the bidirectional reservation, the residue CTBs 32 in the reserved time block 34 can be used for either pair of devices for message transmission to the other device. FIG. 4 shows an example reservation 40 including a bidirectional reservation time block 34 comprising residue CTBs 32A, 32B and a portion of a residue CTB 32C, for multiple message exchange. For a pair of devices such as DEV1 and DEV2, during the residue CTB 32A the device DEV1 transmits to the device DEV2, while during the residue CTB 32B the devices DEV2 and DEV1 transmit to each other, and in CTB32C the device DEV2 transmits to device DEV1. Using the reserved residue CTBs, multiple one-way or both-way exchange of messages can be applied. These reserved residue CTBs can be used to accommodate retransmissions as well. As such, in CTBs 32A and 32C, there is one-way message transmission, while in the CTB 32B there is bidirectional (two-way) message transmission.

To coordinate the transmissions, this bidirectional reservation is made for a sequence of message exchanges. The message transmissions use handshake-like protocols, wherein one device transmits one message, the other device transmits another message only after the first message is received and processed correctly according to the handshake protocol. When the messages are allowed to be sent, the transmission device will use the rest of the reserved block to transmit. One example of the handshake message sequence is the RTT test message sequence as shown in FIG. 2. After the initial message, each subsequent message is sent only after correct receipt of a current message.

The device DEV1 (e.g., transmitter) transmits the RTT initialization and the RTT test messages (commands). The device DEV1 is also responsible for requesting that the coordinator reserve bandwidth for the RTT test before transmitting the RTT test commands. The device DEV2 (e.g., the receiver) transmits the RTT setup and RTT response messages. The coordinator allocates bandwidth after it receives the RTT test bandwidth allocation request from the device DEV1.

Figure 5:
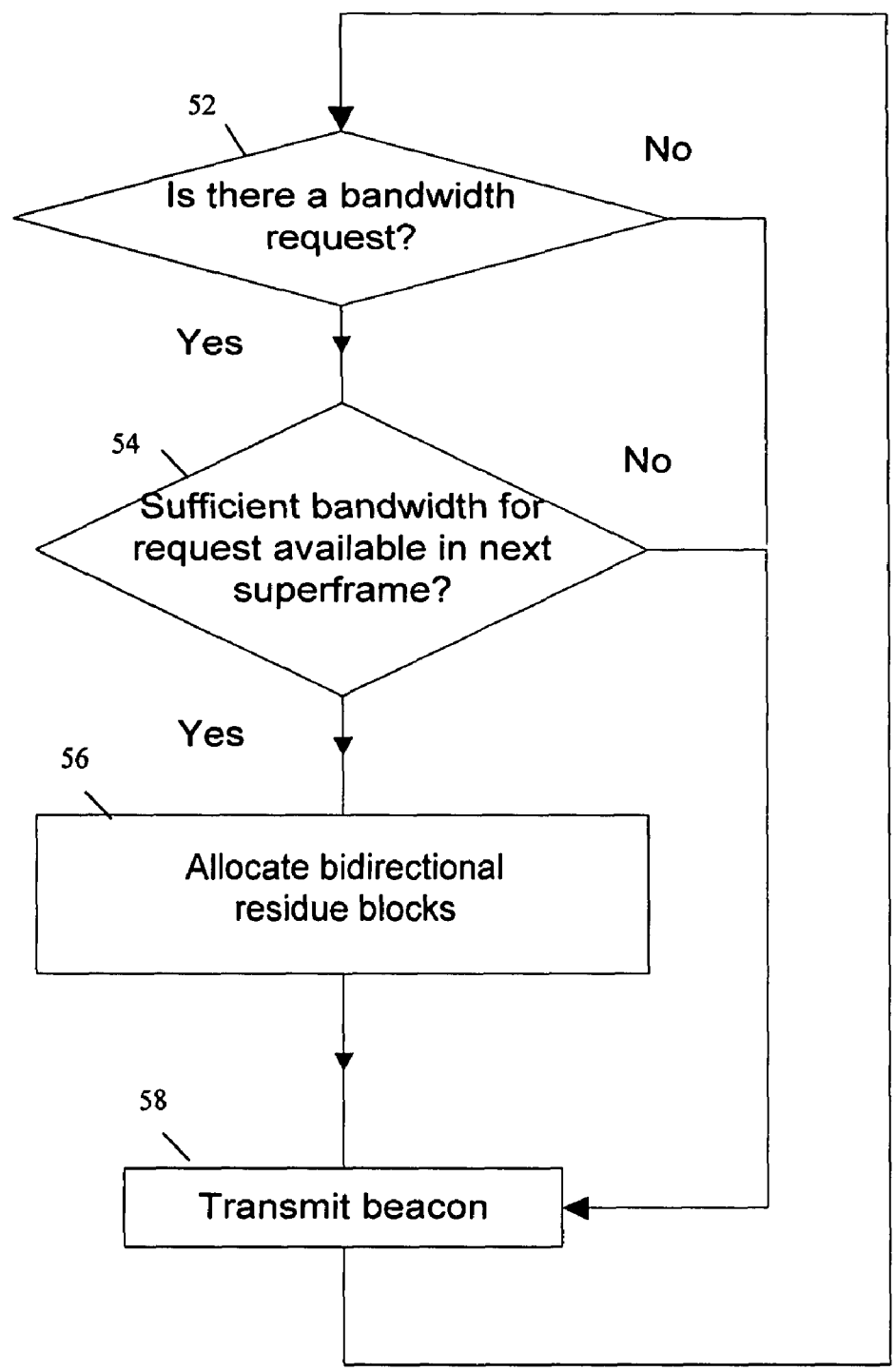
FIG. 5 shows a flowchart of an example reservation process implemented by a coordinator in a wireless network of devices, according to the present invention.
Figure 6:
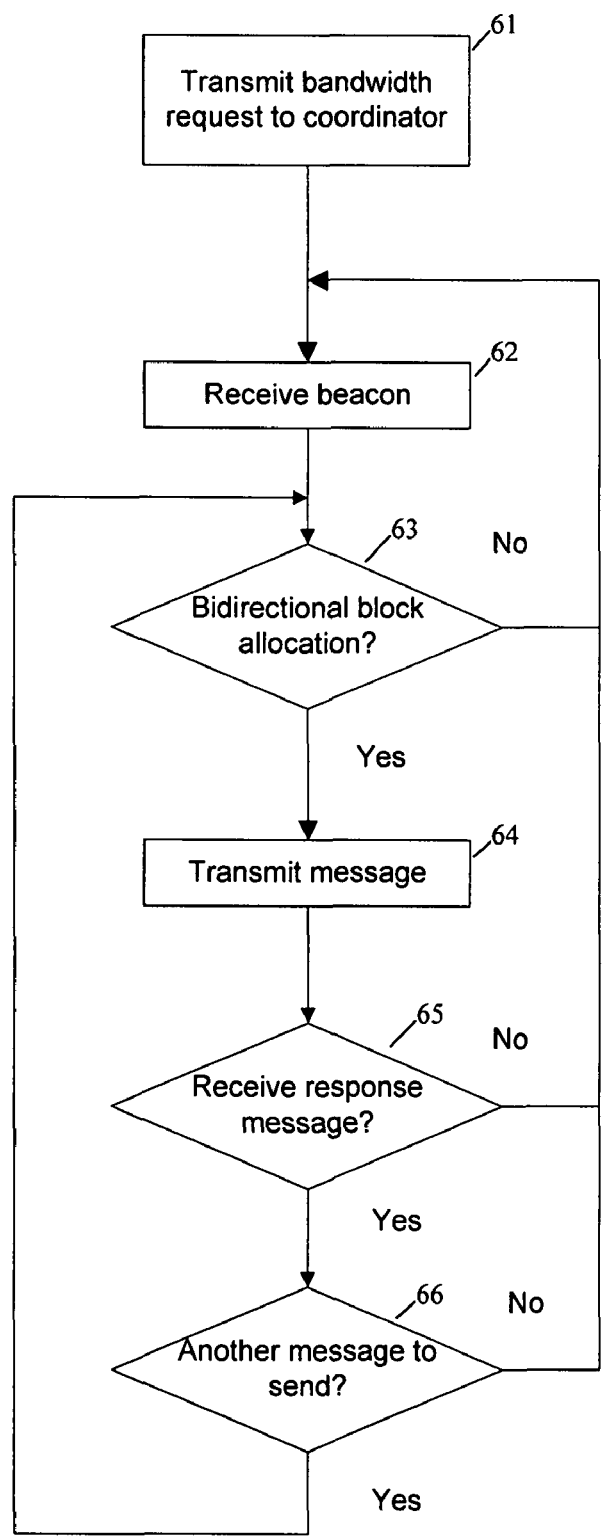
FIG. 6 shows a flowchart of an example process implemented by a transmitter in a bidirectional bandwidth reservation scheme in a wireless network of devices, according to the present invention.
Figure 7:
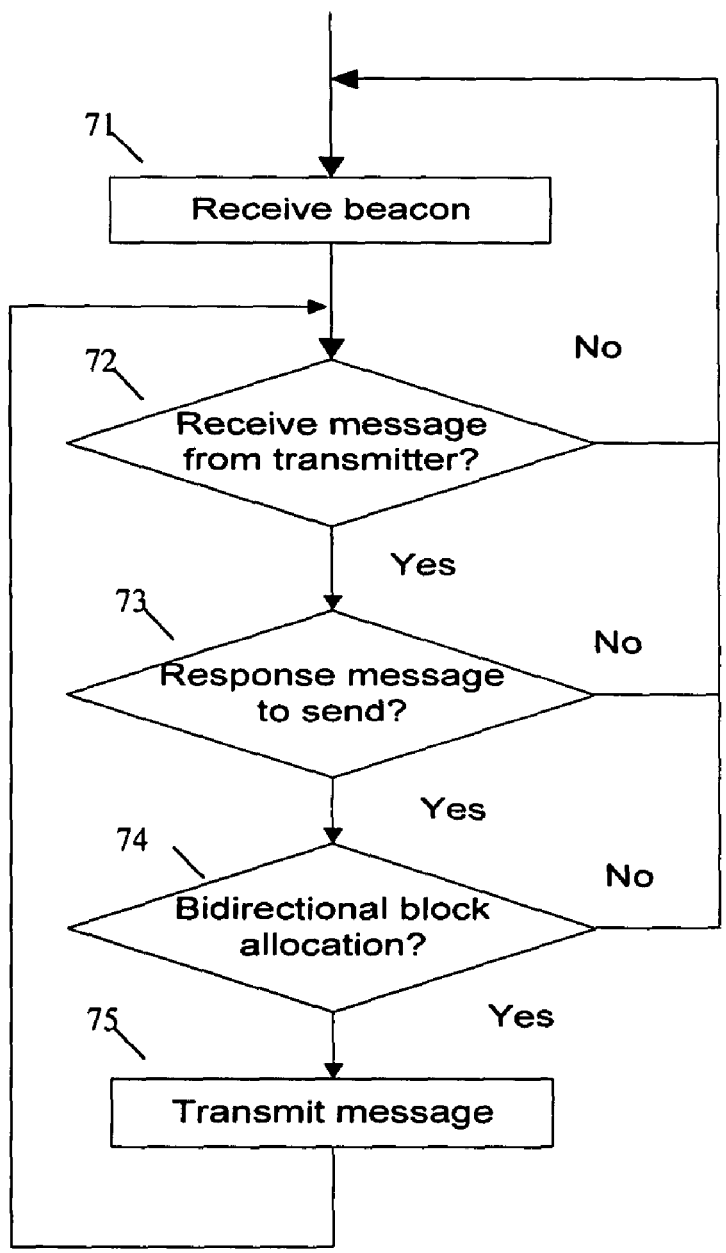
FIG. 7 shows a flowchart of an example process implemented by a receiver in a bidirectional bandwidth reservation scheme in a wireless network of devices, according to the present invention.

FIGS. 5-7 show flowcharts of bidirectional bandwidth reservation and message exchange processes, according to an embodiment of the present invention. The processes are described in relation to RTT testing in a wireless network, but are equally applicable to other applications requiring bidirectional bandwidth reservation for communicating information such as exchanging control messages. Therefore, the scope of the bidirectional bandwidth reservation is not limited to proximity control applications such as RTT testing.

FIG. 5 shows a flowchart of an example bidirectional reservation process 50 implemented by a coordinator in a wireless network of devices, according to the present invention. The process 50 includes the following steps:

Step 52: The coordinator determines if a RTT bandwidth request is received for an RTT test exchange between a pair of devices (e.g., transmitter and receiver). If yes, the process proceeds to step 54, otherwise the process proceeds to step 58.

Step 54: The coordinator determines if sufficient channel bandwidth is available for RTT testing in the next superframe. If yes, the process proceeds to step 56, otherwise the process proceeds to step 58.

Step 56: The coordinator allocates bidirectional residue CTBs (FIGS. 3C and 4).

Step 58: The coordinator transmits a beacon including a schedule of reserved bidirectional time blocks, to indicate the start of a superframe.

FIG. 6 shows a flowchart of an example process 60 implemented by a transmitter (e.g., DEV1 in FIG. 2) in an example bidirectional reservation scheme in a wireless network of devices, according to the present invention. The process 60 allows multiple message exchanges within one block reservation between the transmitter and the receiver, including the following steps:

Step 61: Transmit a bidirectional bandwidth request to the coordinator.
Step 62: Receive a beacon including a schedule from the coordinator.
Step 63: Determine if the schedule has a bidirectional residue block reservation. If yes, go to step 64, otherwise go back to step 61.
Step 64: Transmit a message according to the scheduled bidirectional block reservation.
Step 65: Receive response message? If yes, go to step 66, otherwise go back to step 62.
Step 66: Another message to send? If yes, go back to step 63, otherwise go back to step 62.

FIG. 7 shows a flowchart of an example process 70 implemented by a receiver (e.g., DEV2 in FIG. 2) in an example bidirectional reservation scheme in a wireless network of devices, according to the present invention. The process 70 includes the following steps:

Step 71: Receive a beacon including a schedule from the coordinator.
Step 72: Receive a message from transmitter? If yes, go to step 73, otherwise go back to step 71.
Step 73: Response message to send? If yes, go to step 74, otherwise go back to step 71.
Step 74: Determine if the schedule has a bidirectional block reservation/allocation. If yes, go to step 75, otherwise go back to step 71.
Step 75: Transmit a response message to the transmitter. Go back to step 71.

The transmitter and receiver continue the RTT protocol message exchanges (FIG. 2) based on the bidirectional block reservation schedule (e.g., within the reserved residue CTBs 32 in a time block 34).

Figure 8:
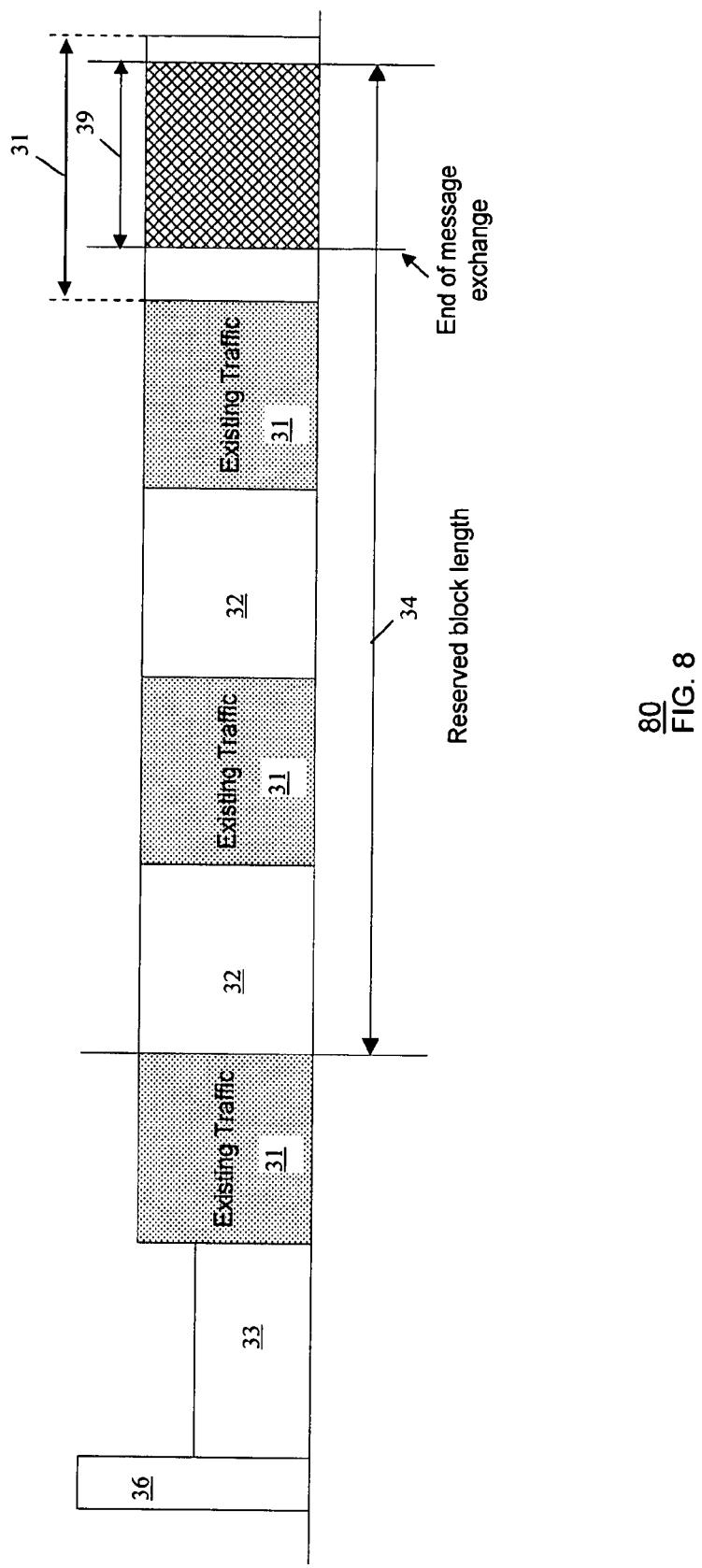
FIG. 8 shows an example bandwidth reservation release, according to the present invention.

There can be instances where the message exchanges (transmissions) within the reserved residue CTBs in a time block 34 are completed before the end of the reserved time block, as shown by the example reservation 80 in FIG. 8. When the message exchange transmissions complete early, remaining reserved residue CTBs 32 can be de-allocated (released). For example in FIG. 8, a period 39 of a reserved residue CTB 32 is de-allocated when message exchanges within the reserved residue CTBs in the time block 34, end before the end of the time block 34. For RTT testing in FIG. 2, if the RTT response is received by the device DEV1 before the end of the reservation 34, the rest of the reservation (i.e., reserved residue CTBs 32 in the time block 34) can be released. The device DEV1 can send a release request message to the coordinator for de-allocating the rest of the reservation. Then the coordinator broadcasts a reservation release message to all other devices, indicating the reservation is released and new requests can be accommodated or a random access block 33 (FIG. 3B) can start.

Figure 9:
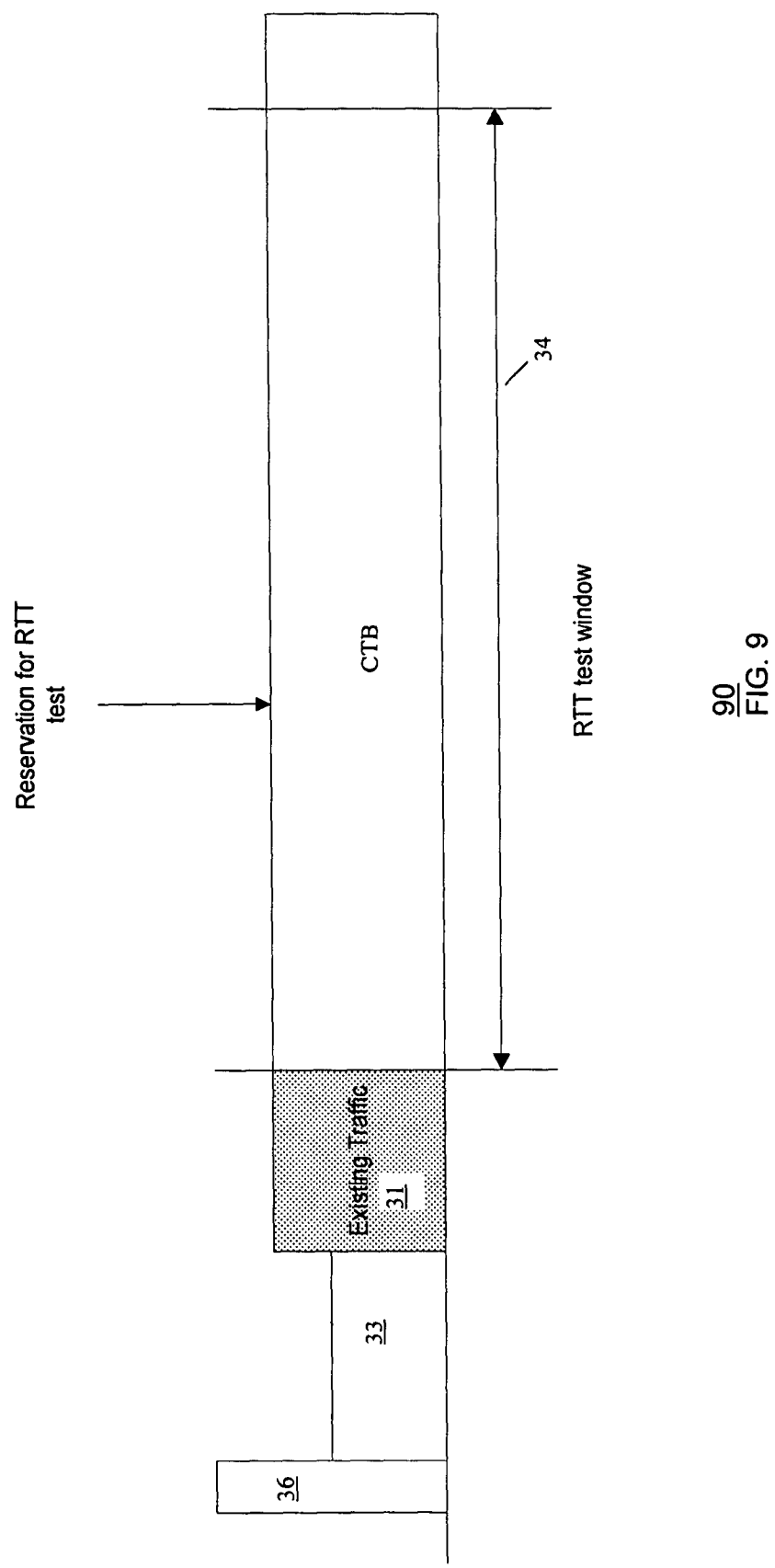
FIG. 9 shows an example reservation, according to the present invention.

As noted, a bidirectional block residue bandwidth reservation (allocation/de-allocation) scheme according to the present invention is generally applicable in wireless networks, such as for RTT testing in a 60 GHz wireless network. In one example, when existing channel traffic is light (e.g., there is a continuous free time block with length equal to, or more than, 7 msec), one residue CTB 32 can be allocated via bidirectional block reservation for RTT testing between a pair of devices (DEV1, DEV2 in FIG. 2). FIG. 9 shows such an example reservation 90 including a reservation block 34, wherein one CTB is allocated via bidirectional block reservation for RTT testing (e.g., FIG. 2) between a pair of devices (e.g., DEV1, DEV2). As such, when there is a continuous time block with length equal to, or more than, 7 msec, then the entire time block is reserved for RTT testing. If the RTT response is received by the DEV1 before the end of the reservation block 34, then the DEV1 (source/transmitter) sends a release message to the coordinator to de-allocate the rest of the reservation block 34. The coordinator then broadcasts a reservation release message to all the devices in the network.

Figure 10:
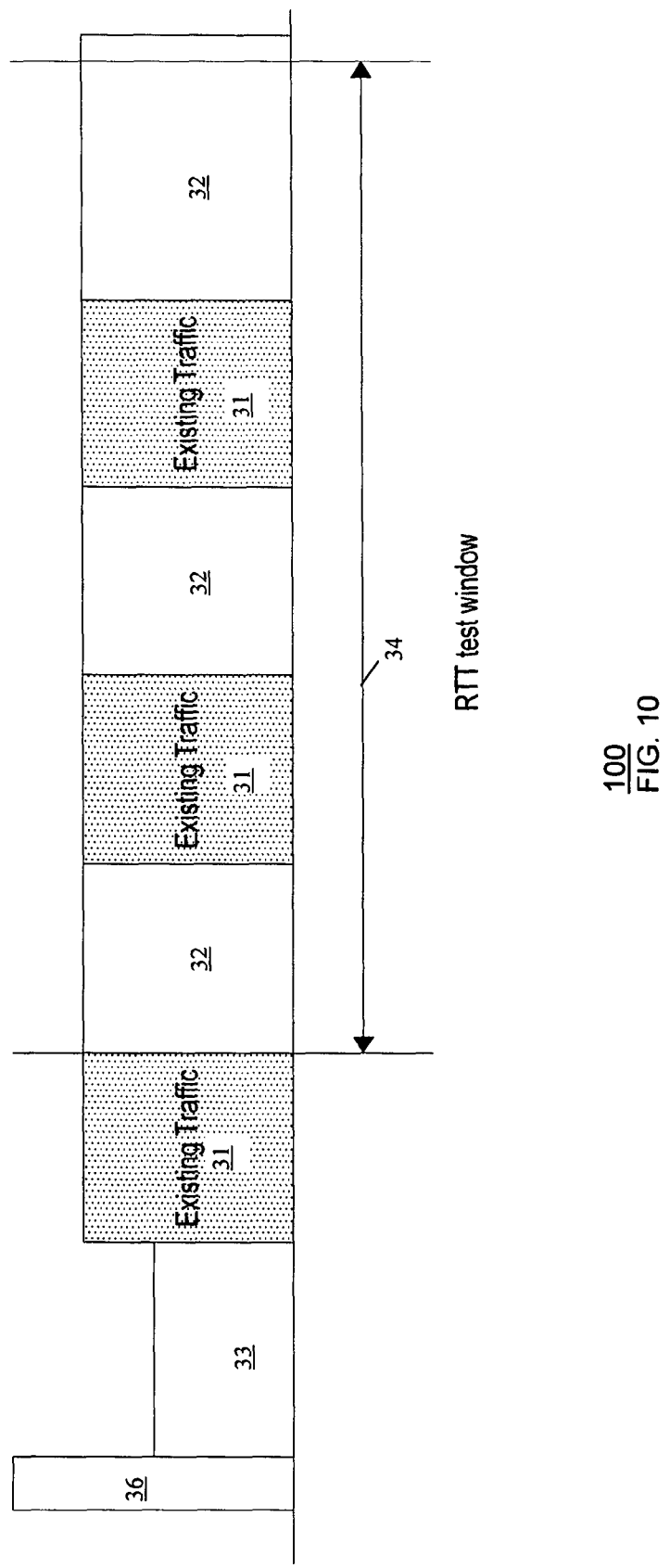
FIG. 10 shows an example reservation including a bandwidth reservation for control messages among heavy existing traffic, wherein bidirectional block residue reservation is applied such that control messages are transmitted in residue CTBs, according to the present invention.

In another example, when existing channel traffic is heavy (e.g., there is no continuous free time block with length equal to, or more than, 7 msec) the bidirectional block residue reservation is applied to reserve multiple residue CTBs for RTT messages. FIG. 10 shows an example reservation 100 including a reservation block 34, wherein existing traffic is heavy, and the bidirectional block residue reservation is applied such that messages (e.g., FIG. 2) are transmitted in the residue CTBs 32 that are reserved. After the RTT is completed, if there remains reserved residue CTBs 32, then the DEV1 sends a release message to the coordinator and the coordinator broadcasts a release message to all the devices.

Figure 11:
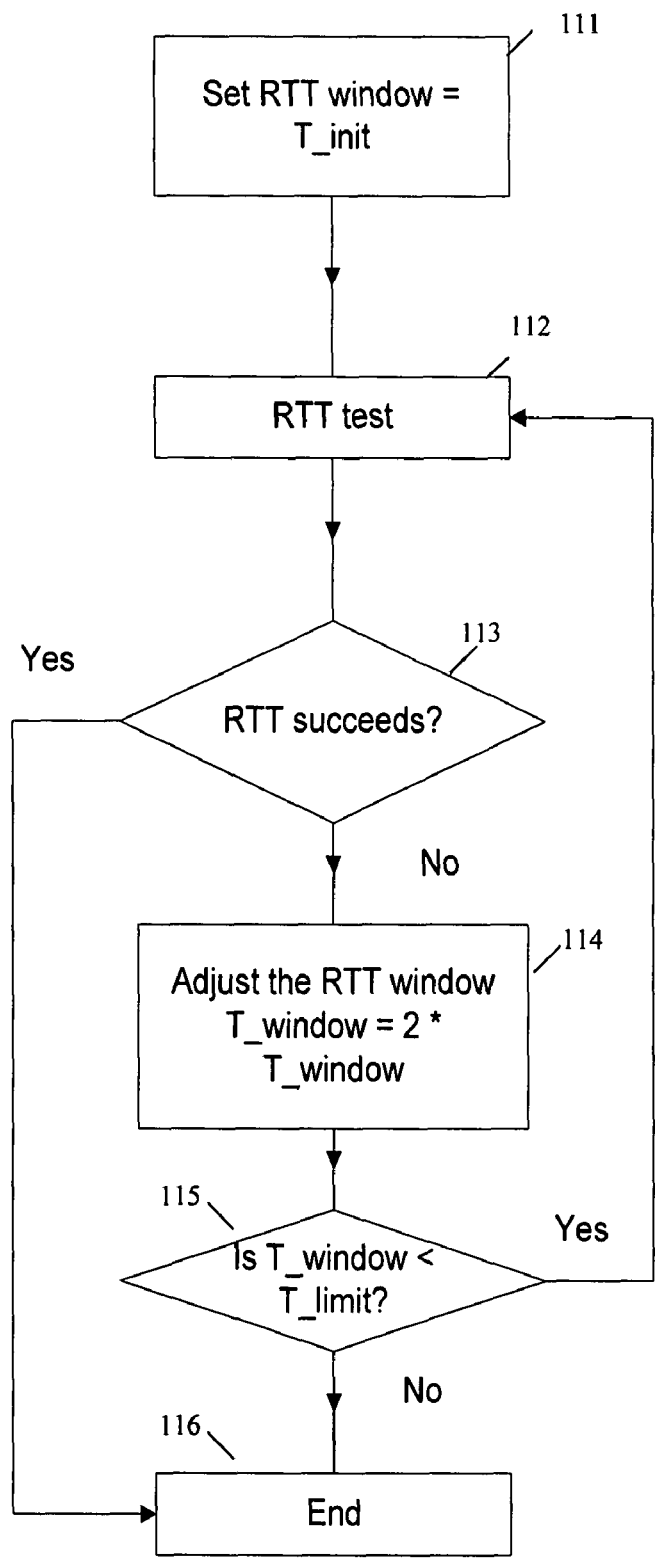
FIG. 11 shows an implementation of a sliding window bandwidth reservation process, according to an embodiment of the present invention.

An example RTT process between two devices can vary in length from less than 1 millisecond to a few milliseconds. For a common home network environment, the RTT is small and stable. A small reservation window for RTT testing is sufficient. However, as noted, the RTT time can vary randomly. In order to accommodate varying RTT times, a sliding/changing window size scheme is implemented by the coordinator according to the present invention. The sliding window scheme provides for reservation of sufficient bandwidth for conducting RTT testing, without reserving more bandwidth than required. In one example, this is accomplished by selecting an initial bandwidth allocation window and attempting an RTT test, and if the RTT test fails, then enlarging the allocation window by an increment and repeating the test. The process is repeated until either the RTT test passes, or an upper limit of the window size is reached according to content provider requirements. FIG. 11 shows an implementation of such a sliding window process 110 including the following steps:

Step 111: Initially, a small window T_init which is sufficiently large for a one hop round trip transmission in a home network environment is used (i.e., T_init is long enough to include the transmission of the RTT test message, the propagation time, the processing time of the RTT test message once the receiver receives it and then the transmission of the RTT response). For a home environment, these values can be estimated, then T_init is set larger than the maximum estimation value.
Step 112: An RTT test message exchange is performed.
Step 113: It is determined if the RTT test was successful? If yes, the process proceeds to step 116, otherwise the process proceeds to step 114.
Step 114: Length of the test window is determined by the coordinator. If the previous RTT test failed, the RTT test window is enlarged. The window size is adjusted (e.g., doubled, T_window=2×T_window).
Step 115: It is determined if the adjusted window length is below a limit T_limit (e.g., T_limit=7 milliseconds). If not, the process proceeds to step 116 wherein the RTT test status is "fail". Otherwise, the process proceeds back to step 112 for another RTT test, wherein the transmitter transmits another RTT test request with indication that this is a successive request for an RTT test to the coordinator, then the coordinator will adjust the RTT window.

Figure 12A:
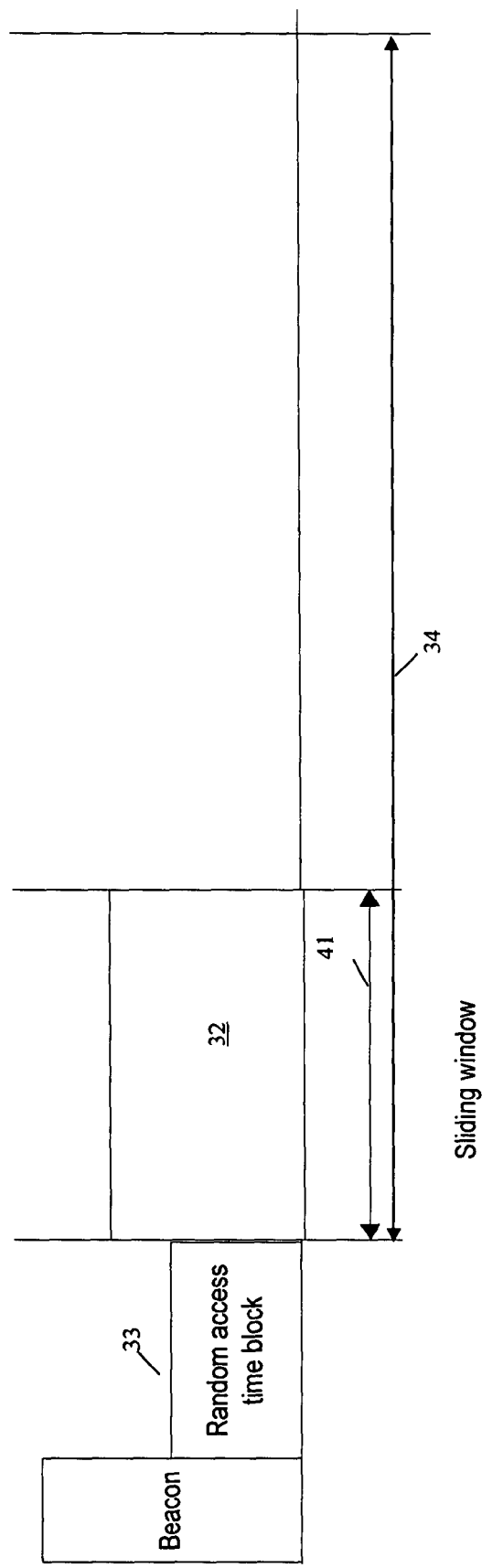

FIGS. 12A-B show a sliding window implementation, according to an example of the reservation process in FIG. 11. As such, every time the window size is changed, a new reservation is made for the RTT test. T_init can be set to be sufficiently large for a home environment (e.g., T_init=1.5 msec), such that in most home environments RTT testing can be completed within the sliding window period T_init. However, in some instances a larger sliding window (T_window) is needed, wherein the T_window is adjusted and exponentially increased to accommodate the need. The maximum/limit T_window is set to satisfy the requirements of each content provider. As shown by example in FIG. 12A, the size of a sliding window 41 is initially the length of a residue CTB allocation block 32, wherein depending on the RTT pass/fail test, the size of window 41 is adjusted by one or more increments 43 as in FIG. 12B. A varying number of time blocks can be allocated to accommodate varying round trip time requests. The sliding window process provides for reservation of sufficient bandwidth for conducting RTT testing, without reserving an unnecessarily long test window.

Figure 13:
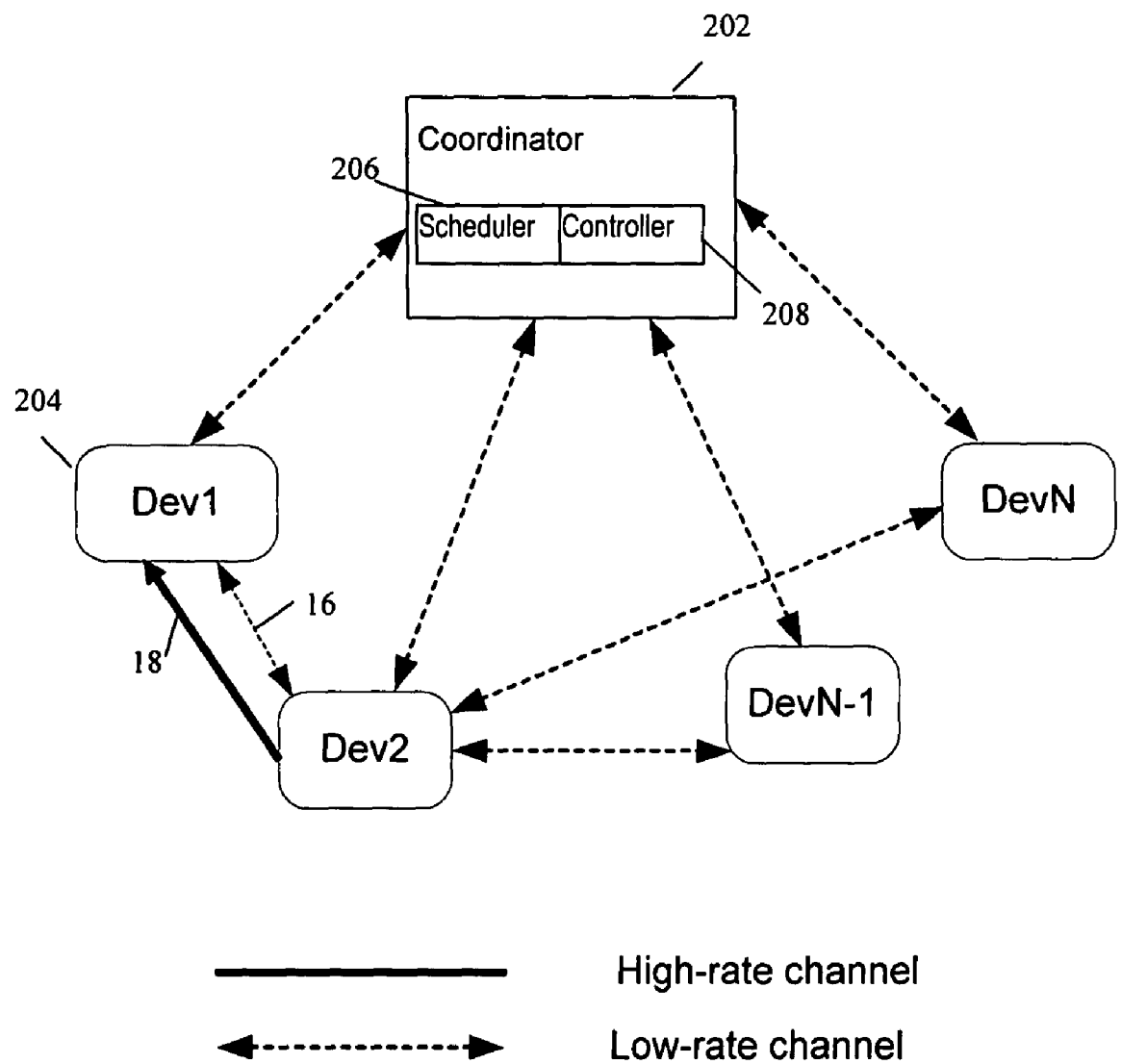
FIG. 13 shows a functional block diagram of another wireless network, according to an embodiment of the present invention.

FIG. 13 shows a functional block diagram of another wireless network 200, according to an embodiment of the present invention. The network 200 includes a coordinator 202 and multiple wireless stations 204 (e.g., Dev1, ..., DevN). The coordinator 202 provides channel access control functions using a bandwidth reservation scheme for the wireless stations. The coordinator 202 manages communication of information over the wireless channels using the superframe scheduling scheme. The coordinator 202 includes a controller 208 that receives channel bandwidth reservation requests and checks channel bandwidth availability, and a scheduler 206 that allocates available channel bandwidth as reserved CTBs and residue CTBs using the superframe scheduling scheme described above, according to the present invention. The scheduler 206 periodically transmits beacons to separate channel time into multiple superframes, each superframe providing one or more schedules. Each schedule including reserved CTBs and allocated residue CTBs, as described.

A reservation scheme according to the present invention also reduces the overhead (e.g., message exchange transmission time) for RTT testing on average, while still accommodating different RTT window values that different content providers require. It provides for a proper RTT test in proximity control for copyrighted content. The RTT test message is transmitted in the reserved residue CTBs using the low-rate channel, but in general the reserved blocks (residue CTBs) can be used for high-rate transmission as well. The reservation scheme is also compatible with common bandwidth reservation protocols. The reservation scheme provides an essentially collision-free bandwidth allocation/de-allocation scheme that can be used in network applications such as in proximity control for content protection.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method of bandwidth allocation for communicating information over one or more wireless channels by wireless stations, comprising the steps of: controlling channel access among wireless stations by dividing channel time into one or more superframes; allocating channel bandwidth by:
reserving one or more channel time blocks (CTBs) in a superframe for communication, resulting in one or more residue CTBs among the reserved CTBs in the superframe;
allocating at least a portion of one or more residue CTBs in the superframe for bidirectional communication between two stations comprising:
selecting an initial bandwidth allocation window;
allocating one or more residue CTBs within the window; and
attempting a Round Trip Time (RTT) proximity control protocol message exchange between the two stations.

2. The method of claim 1 wherein reserving one or more CTBs further includes reserving one or more CTBs for isochronous data transfer.

3. The method of claim 1 wherein allocating at least a portion of one or more residue CTBs further includes allocating at least a portion of one or more residue CTBs for bidirectional communication of control messages between two stations during the allocated residue CTBs.

4. The method of claim 3 wherein allocating channel bandwidth further includes allocating channel bandwidth by providing one or more schedules in each superframe, wherein each schedule comprises one or more reserved CTBs, and at least a portion of one or more allocated residue CTBs for bidirectional communication between two stations.

5. The method of claim 1 further comprising the step of de-allocating at least a portion of an allocated residue CTB upon completion of the bidirectional communication.

6. The method of claim 1 wherein:
the two stations include a first station and a second station; and
performing bidirectional communication further includes:
communicating information from the first station to the second station over a channel during one allocated residue CTB, and then communicating information from the second station to the first station over the channel during said allocated residue CTB or during another allocated residue CTB.

7. The method of claim 1 wherein wireless stations form a 60 GHz wireless network.

8. The method of claim 7 wherein the reserved CTBs are for communication over a high-rate channel and the allocated residue CTBs are for communication over a low-rate channel and/or the high-rate channel.

9. The method of claim 1 wherein the bidirectional communication comprises communicating proximity control messages between the two stations during the allocated residue CTBs for proximity control.

10. The method of claim 9 wherein the bidirectional communication comprises communicating RTT proximity control protocol messages between the two stations during the allocated residue CTBs for proximity control.

11. The method of claim 9 wherein allocating one or more residue CTBs further includes allocating a number of residue CTBs sufficient for conducting RTT message exchanges between the two stations to satisfy a certain round trip time limit for proximity control.

12. The method of claim 9 if the RTT test fails, then enlarging the allocation window by an increment and repeating the RTT proximity control protocol message exchange between the two stations.

13. The method of claim 9 wherein allocating one or more residue CTBs further includes: selecting an initial bandwidth allocation window, allocating one or more residue CTBs within the window, attempting a RTT proximity control protocol message exchange between the two stations, and if the RTT test fails, then enlarging the allocation window by an increment so long as the enlarged window does not exceed a certain round trip time limit for proximity control, and repeating the RTT proximity control protocol message exchange between the two stations.

14. A coordinator for bandwidth allocation for communicating information over one or more wireless channels in by wireless stations, comprising:
 a controller configured for receiving a bandwidth request from a source wireless station for transmission of information, and determining channel bandwidth availability; and
 a scheduler configured for dividing channel time into one or more superframes and allocating available channel bandwidth by:
  reserving at least a portion of one or more channel time blocks (CTBs) in a superframe for communication, resulting in one or more residue CTBs among the reserved CTBs in the superframe; and
  allocating at least a portion of one or more residue CTBs in the superframe for bidirectional communication between two stations by selecting an initial bandwidth allocation window, allocating one or more residue CTBs within the window, and attempting a Round Trip Time (RTT) proximity control protocol message exchange between the two stations.

15. The coordinator of claim 14 wherein the scheduler is configured for reserving one or more CTBs further includes reserving one or more CTBs for isochronous data transfer.

16. The coordinator of claim 14 wherein the scheduler is configured for allocating at least a portion of one or more residue CTBs for bidirectional communication of control messages between two stations during the allocated residue CTBs.

17. The coordinator of claim 16 wherein the scheduler is configured for allocating channel bandwidth by providing one or more schedules in each superframe, wherein each schedule comprises one or more reserved CTBs, and at least a portion of one or more allocated residue CTBs for bidirectional communication between two stations.

18. The coordinator of claim 14 wherein the scheduler is configured for de-allocating at least a portion of an allocated residue CTB upon completion of the bidirectional communication.

19. The coordinator of claim 14 wherein the:
 the two stations include a first station and a second station; and
 performing bidirectional communication further includes: communicating information from the first station to the second station over a channel during one allocated residue CTB, and then communicating information from the second station to the first station over the channel during said allocated residue CTB or during another allocated residue CTB.

20. The coordinator of claim 14 wherein the wireless stations operate in a 60 GHz frequency band.

21. The coordinator of claim 20 wherein the reserved CTBs are for communication over a high-rate channel, and the allocated residue CTBs are for communication over a low-rate channel and/or the high-rate channel.

22. The coordinator of claim 14 wherein the bidirectional communication comprises communicating proximity control messages between the two stations during the allocated residue CTBs for proximity control.

23. The coordinator of claim 22 wherein the bidirectional communication comprises communicating RTT proximity control protocol messages between the two stations during the allocated residue CTBs for proximity control.

24. The coordinator of claim 22 wherein the scheduler is further configured for allocating at least a portion of one or more residue CTBs sufficient for conducting RTT message exchanges between the two stations to satisfy a certain round trip time limit for proximity control.

25. The coordinator of claim 22 wherein the scheduler is further configured for allocating one or more residue CTBs by: if the RTT test fails, then enlarging the allocation window by an increment and repeating the RTT proximity control protocol message exchange between the two stations.

26. The coordinator of claim 22 wherein the scheduler is further configured for allocating one or more residue CTBs by: if the RTT test fails, then enlarging the allocation window by an increment so long as the enlarged window does not exceed a certain round trip time limit for proximity control, and repeating the RTT proximity control protocol message exchange between the two stations.

* * * * *